(12) United States Patent
Takai et al.

(10) Patent No.: US 9,756,867 B2
(45) Date of Patent: Sep. 12, 2017

(54) PROCESS FOR PRODUCING SOYMILK AND APPARATUS FOR PRODUCING SOYMILK

(75) Inventors: Toichiro Takai, Ishikawa (JP); Toru Awazu, Iskikawa (JP); Toshio Hirata, Ishikawa (JP)

(73) Assignee: TAKAI TOFU & SOYMILK EQUIPMENT CO., Ishikawa (JP)

( * ) Notice: Subject to any disclaimer, the term of this patent is extended or adjusted under 35 U.S.C. 154(b) by 803 days.

(21) Appl. No.: 12/449,439

(22) PCT Filed: Dec. 10, 2007

(86) PCT No.: PCT/JP2007/073751
§ 371 (c)(1),
(2), (4) Date: Sep. 4, 2009

(87) PCT Pub. No.: WO2008/102503
PCT Pub. Date: Aug. 28, 2008

(65) Prior Publication Data
US 2010/0323075 A1    Dec. 23, 2010

(30) Foreign Application Priority Data

Feb. 23, 2007  (JP) .................................. 2007-043923

(51) Int. Cl.
*A23C 11/10*    (2006.01)
*A23L 5/10*     (2016.01)
*A23L 11/00*    (2016.01)

(52) U.S. Cl.
CPC .............. *A23C 11/103* (2013.01); *A23L 5/17* (2016.08); *A23L 11/05* (2016.08)

(58) Field of Classification Search
CPC ............................... A23C 11/103; A23L 11/05
See application file for complete search history.

(56) References Cited

U.S. PATENT DOCUMENTS 2,495,878 A * 1/1950 Tull ...................... F25D 31/003
                                                        62/188

FOREIGN PATENT DOCUMENTS

JP    H08-242801    9/1996
JP    H10-296494    11/1998
JP    2002-306104   10/2002
(Continued)

OTHER PUBLICATIONS

Machine Translation of JP 2002-306104 to Takai, Toichiro et al. Publication Date Oct. 22, 2002, pp. 1-8.*
(Continued)

*Primary Examiner* — Jenna A Watts
(74) *Attorney, Agent, or Firm* — Manabu Kanesaka

(57) ABSTRACT

An apparatus for producing soymilk includes heating units for heating a soybean soup, a defoaming unit for defoaming a heated soybean soup, an extracting unit for separating a defoamed soybean soup into soymilk, bean curd refuse and a liquid residue, and pipe lines for returning the separated liquid residue between the defoaming unit and the heating unit to refeed the separated liquid residue to the defoaming unit. The pipe lines for refeeding the separated liquid residue to the defoaming unit are connected to a liquid residue discharge port of the extracting unit from which the separated liquid residue is taken out and refed to the defoaming unit with a transfer pump.

10 Claims, 6 Drawing Sheets

(56) References Cited

FOREIGN PATENT DOCUMENTS

| JP | 3392322 | 1/2003 |
|----|---------|--------|
| JP | 2003-245503 | 9/2003 |

OTHER PUBLICATIONS

Chemical Engineering Publication. "Don't be baffled by static mixers: how to select and size the correct static mixer". Available online and publication date May 1, 2003. pp. 1-3.*
Machine Translation of JP 10-296494 to Takai, Toichiro et al. Publication Date Oct. 11, 1998, pp. 1-7.*

\* cited by examiner

PROCESS FOR PRODUCING SOYMILK AND APPARATUS FOR PRODUCING SOYMILK

TECHNICAL FIELD

The present invention relates to a process for producing soymilk and an apparatus for producing soymilk, in each of which bubbles are prevented from being produced.

BACKGROUND ART

Tofu, fried bean-curd and soymilk that is their mother liquor, are traditional health food products having soybeans used as the raw material and rich in nutrients. In recent years, tofu or fried bean-curd that is a natural food and soymilk that is their mother liquor have attracted lots of attention among health-conscious consumers.

In order to produce soymilk, soybeans are soaked in water overnight to sufficiently absorb the water and ground down by friction, with water added thereto, to produce a soybean soup that is heated with a heating unit and separated with an extracting unit into soymilk and bean curd refuse. Tofu produced from soymilk having many specks (minute soy fibers) mixed therein in the separating step exhibits a gritty and powdery mouthfeel and little elasticity to deteriorate the flavor and eating texture tofu has to possess per se, and fried bean-curd produced from such tofu prevents tofu dough from being elongated and deteriorates its surface layer stretching. For these reasons, a conventional extracting unit performs natural filtration (gravity filtration: spontaneous) so as not to mix specks in soymilk under pressure forcibly applied to a soybean soup (Patent Document 1, for example). However, the natural filtration results in low extractability of soymilk and large raw-material waste. On the other hand, forcible filtration entails a problem that specks are mixed in extracted soymilk to deteriorate the flavor of the soymilk.

Since soymilk still containing foam is poor to react with bittern (Nigari), makes a coagulating period of time long and is difficult to produce fine tofu, Patent Document 2 discloses a process for producing soymilk for handmade tofu, comprising subjecting a heated soybean soup to primary defoaming using a defoaming unit, extracting the soybean soup using a pressure extracting unit to separate it into soymilk and bean curd refuse (Okara), introducing the soymilk extracted with the pressure application extracting unit into a speck remover to filtrate the soymilk, and subjecting the filtered soymilk to secondary defoaming using a vacuum pan.

Patent Document 1: Japanese Patent No. 3392322
Patent Document 2: JP-A HEI 8-242801
Patent Document 3: JP-A 2002-306104
Patent Document 4: JP-A 2003-245503

DISCLOSURE OF THE INVENTION

Problems the Invention Intends to Solve

However, since the extracting unit has a screen (net) for filtering a soybean soup and a rotating body, such as a screw, for extracting soymilk and since large quantities of air bubbles are generated from the soymilk extracted with the extracting unit, when the soymilk has been inserted into a speck remover (extracting unit), the screen of the speck remover (extracting unit) is soon clogged with the generated air bubbles to entail a problem that the filtration coefficient is lowered. In addition, when the bubbles are accumulated on an open portion like a spontaneous filtering portion, an exit for a filtration residue separated from the soymilk is blocked up by the bubbles, bean curd refuse and specks flow into a soymilk path together with the overflowing bubbles, the soymilk containing large quantities of bean curd refuse and specks is fed to a next step in spite of the fact that soymilk having the specks removed is to be obtained in the nature of things, and thus it is impossible to secure stable production. Though a method of adding a defoamer to the soymilk is conceivable as a countermeasure against the above, the addition of the defoamer deteriorates the taste of soymilk per se and allows such soymilk to be not called as a health food product.

Furthermore, the applicant of the present application proposed in Patent Document 3 or 4 a defoaming apparatus for removing air bubbles from a soybean soup easy to produce bubbles. The aforementioned problems still remain even when combining Patent Document 3 or 4 with the extracting unit (Patent Document 1, for example), and the minute bean curd refuse-containing liquid residue (also called "speck liquid", "speck-containing soymilk" or "soymilk containing minute bean curd refuse) left after separation into soymilk and bean curd refuse just has to be disposed of.

The object of the present invention is, therefore, to provide a process and apparatus for producing soymilk, in each of which high-quality soymilk can be produced, with overflow of bubbles avoided, and the extractability (extraction ratio) of the soymilk is simultaneously heightened.

Means for Solving the Problems

A method of the present invention for producing soymilk comprises a heating step of heating a soybean soup, a defoaming step of defoaming a heated soybean soup, an extracting step of separating a defoamed soybean soup into soymilk, bean curd refuse and a liquid residue containing minute bean curd refuse and a liquid residue-returning step of returning the separated liquid residue, wherein the separated liquid residue is returned to a position before the defoaming step or behind the heating step and fed again to the defoaming step. In addition, an apparatus of the present invention for producing soymilk set forth in claim 4 comprises a heating unit for heating a soybean soup, a defoaming unit for defoaming a heated soybean soup, an extracting unit for separating a defoamed soymilk into soymilk, bean curd refuse and a liquid residue containing minute bean curd refuse, and a pipe line for returning the separated liquid residue to a position before the defoaming unit or behind the heating unit and feeding the separated liquid residue again to the defoaming unit, wherein the pipe line for feeding the separated liquid residue to the defoaming unit is connected to an exit of the extracting unit from which the separated liquid residue is to be taken out.

Here, it is noted that the "position before the defoaming step" indicates a side closer to the defoaming unit than to the heating unit, that the position "behind the heating unit" indicates a side closer to the heating unit than to the defoaming unit and that the difference between the two strictly lies in how to receive the influence of heat. Incidentally, the "heating the soybean soup" used herein indicates elevating the temperature of the soybean soup by intentional heating means. Though the temperature range is not particularly limited, the temperature of the soybean soup is elevated generally up to an optional final temperature in the range of 40° C. to 150° C. The case where the temperature is elevated and lowered in the course of the temperature elevation is also embraced.

According to the present invention, since the liquid residue containing minute bean curd refuse separated at the extracting step is returned to a position before the defoaming step or behind the heating step and fed again to the defoaming step, a soymilk component can be taken out from the liquid residue that has heretofore been disposed of at a higher ratio to make it possible to heighten the soymilk extractability (extraction ratio). Though the liquid residue has its temperature lowered, it is heated through mixture with the heated soybean soup and liquefied. In addition, the soybean soup passing through the defoaming unit has all the bubbles therein allowed to disappear and is completely liquefied and fed to the subsequent separating step. Furthermore, since the bubbles in the separated filtration residue at the exit for the liquid residue are all returned, the conventional situation in which the exit for the filtration residue separated from soymilk is blocked up by the bubbles can be prevented. Therefore, it is also possible to prevent the speck liquid from entering the soymilk path together with the bubbles.

Here, it is conceivable that the liquid residue separated at the extracting step (with the extracting unit) is returned to a position before the heating step (the heating unit) using the transfer pump or that in the case of a continuous heating (cooking) unit the liquid residue or soymilk separated is returned to the midway of the heating step (the heating unit). It is additionally conceivable that the soymilk separated at the extracting step (with the extracting unit) is again returned to the extracting step (with the extracting unit). However, since the soymilk separated at the extracting step (with the extracting unit) contains large quantities of bubbles generated, it is not preferable to return such soymilk to the extracting step (with the extracting unit). On the other hand, in the case where the soymilk is returned to a position before or midway the heating step, the soymilk is repeatedly heated though partially to transubstantiate the proteins, thereby changing the color of the soymilk to a dark color. Continuous heating of the soymilk over a long period of time will possibly result in quality loss through mixture of excessively heated soymilk.

What is preferable in the present invention is to adopt a procedure of returning the liquid residue to a position before the defoaming step or behind the heating unit using the transfer pump, stirring and mixing the liquid residue and the soybean soup heated at the heating step and feeding the resultant mixture to the defoaming step. By forcibly returning the liquid residue, using the transfer pump, it is possible to prevent bubbles from being accumulated at the exit for the liquid residue and, at the same time, to attain a high coefficient of mixing with the heated soybean soup. In addition, the defoaming unit is preferably provided with means for boiling under reduced pressure the mixture of the liquid residue and soybean soup that have been stirred and mixed and cooling means for cooling the boiled mixture. Boiling the mixture causes the bubbles produced within the defoaming unit to contain water vapor therein, the water vapor to be cooled with the cooling means and liquefied (condensed) to allow the bubbles to disappear. In the absence of the cooling means, it takes much time to allow the bubbles to disappear to possibly overflow the bubbles within the unit.

Effects of the Invention

According to the present invention, since the liquid residue separated at the extracting step is returned to a position before the defoaming unit or behind the defoaming unit using the transfer pump and fed again to the defoaming step, it is possible to take out a soymilk component from the liquid residue that has heretofore been to be only disposed of and heighten the extractability of soymilk. In addition, the adoption of the step of returning the liquid residue enables even a small apparatus to produce high-quality soymilk without use of any large-scale apparatus. Furthermore, since soymilk can stably be produced for a long period of time without use of a defoamer (defoaming agent) that is not always necessitated in the nature of things as a material for producing tofu or fried bean-curd, the production cost is reduced and, since no excessive substance is contained, the flavor soybeans per se have will not be deteriorated. Since no food additive other than soybeans, water and coagulant is contained, the enhancement of the quality of tofu as a health food product can be attained.

Furthermore, according to the present invention, since bubbles do not overflow at the extracting step even in the presence of an opening, such as a natural (spontaneous) filtering portion, a decrease in yield can be avoided. Moreover, since the speck liquid and bubbles do not enter the soymilk path and since the bubbles that have heretofore overflowed at the exit for the filtration residue are returned, such a situation as blocking up the exit for the filtration residue by bubbles can be prevented.

BEST MODE FOR CARRYING OUT THE INVENTION

The best mode for carrying out the invention will be described in detail with reference to the drawings.

Embodiment of the Present Invention

Figure 1:
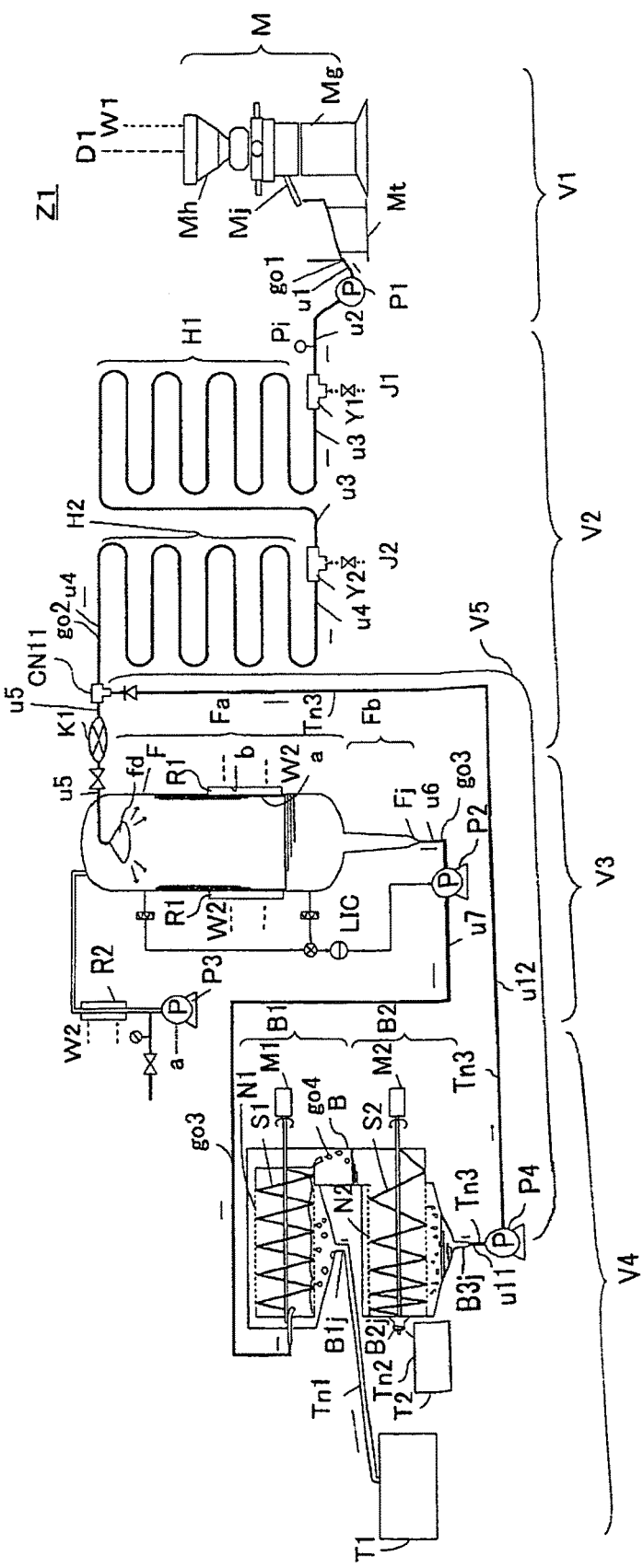
FIG. 1 is a schematic view illustrating a soymilk producing apparatus according to one embodiment of the present invention.

FIG. 1 schematically shows an apparatus Z1 for producing soymilk according to the present invention. The soymilk-producing apparatus adopts a step V1 of producing a soybean soup, a heating step V2 of heating the soybean soup, a defoaming step V3 of defoaming the heated soybean soup, an extracting step V4 of separating the defoamed soybean soup into soymilk, bean curd refuse and liquid residue containing minute bean curd refuse, and a liquid residue-returning step V5 for returning the separated liquid residue.

At the soybean soup-producing step V1, soybeans are fed by a constant amount every time from a soaked soybean hopper to a friction-grinding unit M to produce a raw soybean soup by means of the friction-grinding unit M. The friction-grinding unit M comprises a hopper portion Mh into which raw soybeans and grinding water are introduced and a grinder portion Mg where the raw soybeans are ground by friction. The soybean soup produced is fed to the heating step V2 with a supply pump (metering pump) P1 and heated there.

Figure 2:
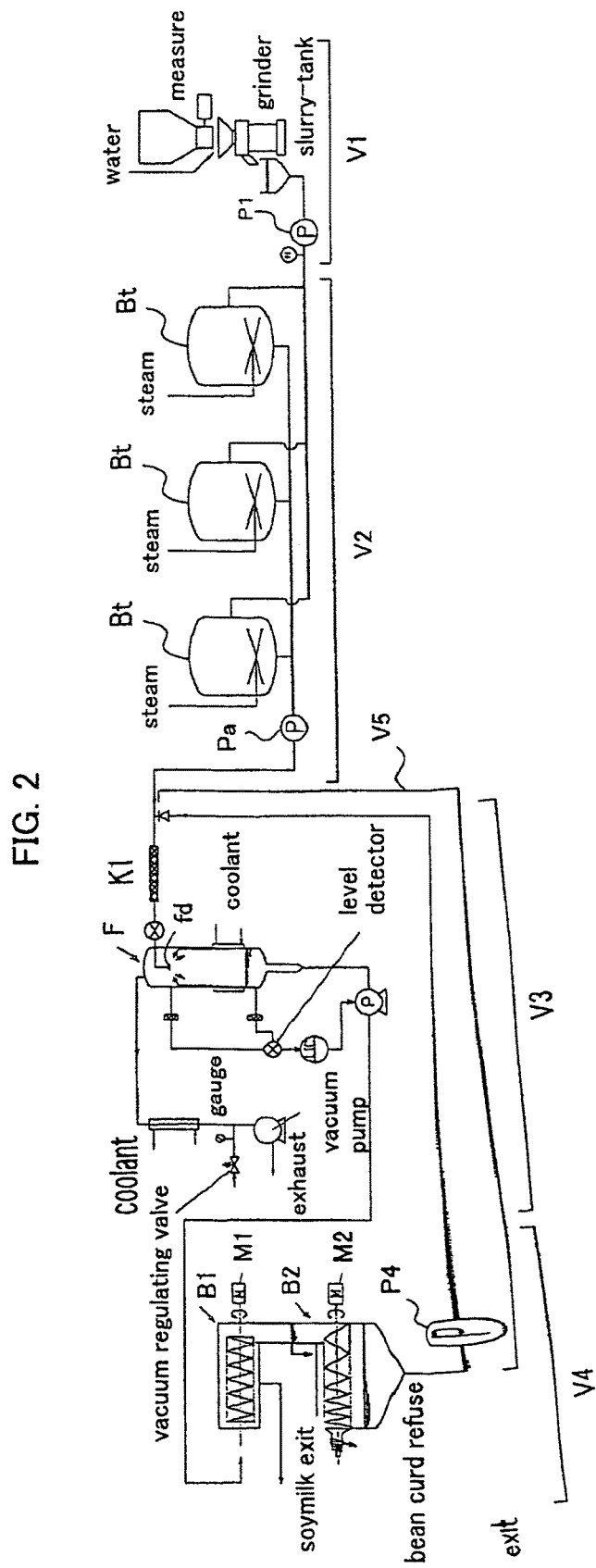
FIG. 2 is a schematic view illustrating the soymilk producing apparatus according to another embodiment of the present invention.
Figure 3:
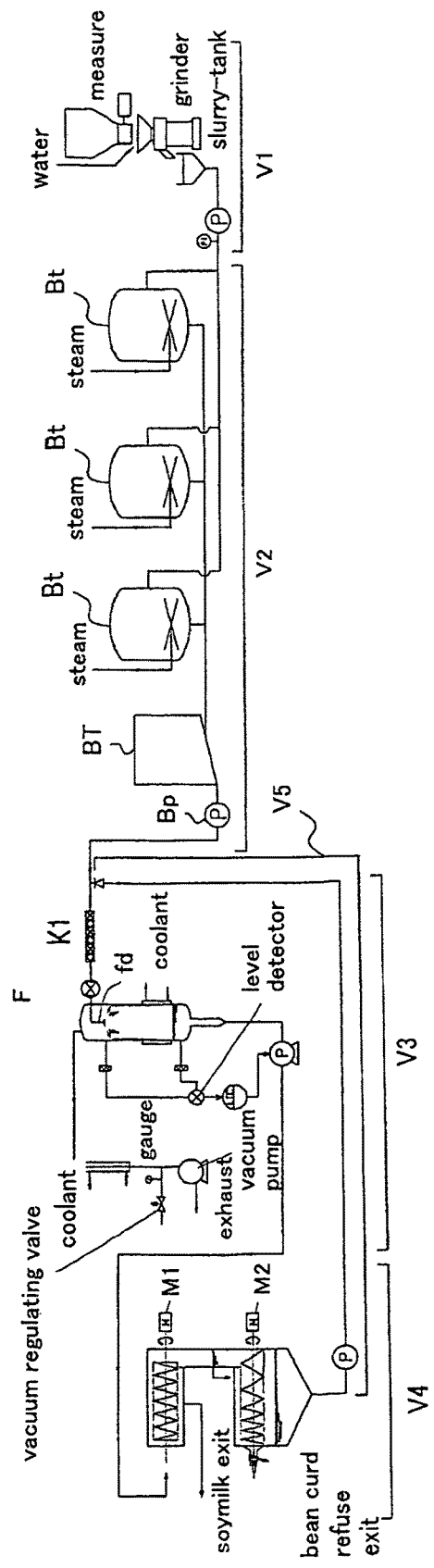
FIG. 3 is a schematic view illustrating the soymilk producing apparatus according to still another embodiment of the present invention.

In the heating step V2, a first heating unit H1 and a second heating unit H2 are continuously disposed. The first and second heating units H1 and H2 can utilize directly brown steams J1 and J2 by steam blowing means Y1 and Y2 and indirect steam heating, i.e. means disposed on the outer periphery of a pipe line (pipe) u3 or u4 for performing heating from the outside, an electric heater, IH, microwave heating, energization heating (Joule heating) or direct fire heating. The heating step V2 may adopt a type of continuous heating as in the present embodiment or a type connecting batch unit patterns Bt as shown in FIG. 2, or independent heating of each of these types. Otherwise, as shown in FIG. 3, a balance tank BT disposed behind the heating unit and having the pipe line u4 connected behind the balance tank BT to a pipe line u12 adopted at the liquid residue-returning step V5 may be adopted. Incidentally, a transfer pump Bp is disposed behind the balance tank BT. The soybean soup heated at the heating step V2 is fed to a defoaming unit F via pipe lines u3, u4 and u5. As the transfer pump (metering pump) P1, a steam ejector or a method of blowing by oil pressure, water pressure or air pressure may be adopted besides a rotary pump, gear pump, tubing pump, Moineau pump, plunger pump, vane pump, etc.

Figure 6:
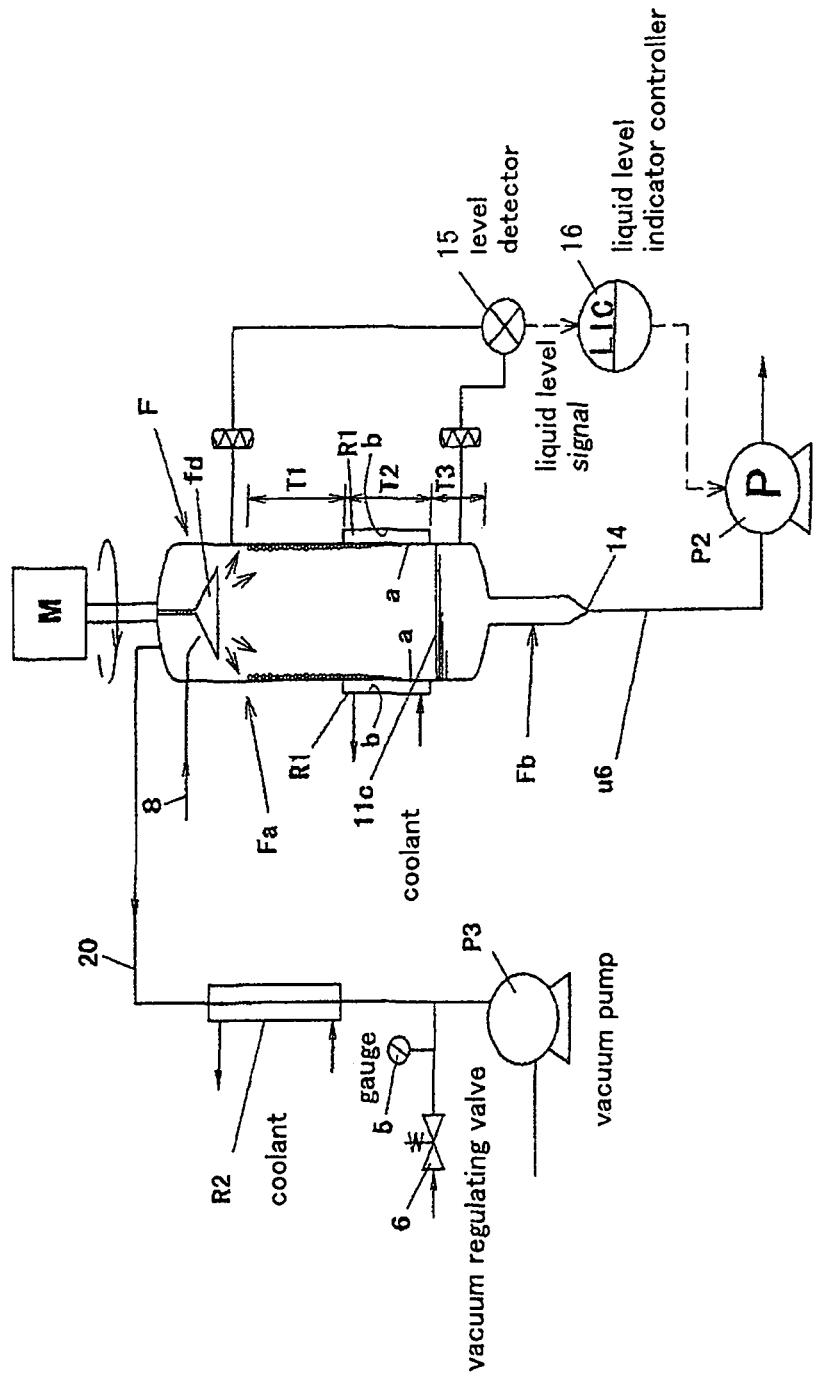
FIG. 6 is a schematic view illustrating a defoaming unit according to the embodiments of the present invention.

At the defoaming step V3, the soybean soup is defoamed under reduced pressure. The defoaming unit F used at this step is made of a metal and, as shown in FIG. 6, comprises a large-diameter portion Fa and a lower small-diameter portion Fb, wherein the large-diameter portion Fa has a lower portion of dual structure comprising an inner wall a that forms an inside surface and an outer wall b that forms an outside surface and first cooling means (cooling means) R1 to which cooling water is supplied is disposed between the inner and outer walls a and b constituting the dual structure. The small-diameter portion Fb is provided on the lower end thereof with a pipe line (pipe) u6 via which the liquid is discharged out by means of a drainage pump P2. The defoaming unit F is equipped with a vacuum pump (of a water seal type) P3 for vacuumizing the inside of the unit, dispersing means fd for dispersing into the unit the soybean soup (heated soybean soup) supplied at a constant flow rate by the supply pump (metering pump) P1, the first cooling means R1 and a liquid level detector 15. The liquid level detector 15 may be of a liquid pressure type, ultrasonic type or tuning-fork type, and the detection may be made by a float method. The liquid level detector 15 is disposed at upper and lower parts of the large-diameter portion Fa of the defoaming unit F in the present embodiment so as to utilize a pressure difference between the two parts, thereby detecting a liquid level with a differential pressure sensor, and may be attached to the small-diameter portion Fb. A signal from the liquid level detector 15 is sent to a liquid level indicator controller 16 to control the number of revolutions of the drainage pump P2. Though the vacuum pump (of the water seal type) P3 is used to deaerate (deair) the inside of the defoaming unit F, a water ejector, air ejector, steam ejector, roots vacuum pump, mechanical booster pump, etc. may be utilized instead. The vacuum pump P3 is provided in the path thereof with a vacuum gauge 5, a vacuum regulating valve 6 and a condenser. Water vapor evaporated within the defoaming unit F is condensed and cooled with a condenser R2 that is the second cooling means and is disposed midway an exhaust pipe 20 reaching the vacuum pump (of the water seal type) P3 and discharged out of the system together with exhaust air of the vacuum pump P3. Though the condenser system adopts a dual structure (double-pipe system) capable of cooling the exhaust pipe 20 from the outside with cooling water, the system is not limited. A multitubular type, coil type, plate type, for example, may be adopted. Incidentally, the defoaming unit may, of course, be configured such that only the large-diameter portion Fa thereof is can-shaped.

The dispersing means fd is for forming the soybean soup into a thin film or dispersing the soybean soup when the soybean soup is supplied into the defoaming unit F and is provided, on the distal end of a nozzle to which the soybean soup is supplied, with a flush disc fd that is rotated by means of the motor M. Therefore, when the soybean soup (and further the liquid residue) introduced into the defoaming unit F is dispersed by means of the flush disc fd, it is dispersed toward a can wall a of the defoaming unit F to flow downward to the bottom through the inner wall a. The dispersing means fd may be of a spray ball type having a plenty of fine pores or a thin-film slit type performing dispersion, or may be a general nozzle for dispersion, spraying or tank cleaning, a simple nozzle having a shape capable of naturally dispersing the soybean soup, or a rotatable nozzle. In addition, the dispersing means fd may adopt a method of supplying the soybean soup onto a rotating disc and dispersing the soybean soup toward the surroundings by means of the centrifugal force of the rotating disc or a method of injecting the soybean soup from a nozzle.

The first cooling means R1 is of a water flow type attached to the outer wall of the defoaming unit F and is disposed substantially at the center of the large-diameter portion Fa of the can-shaped defoaming unit F. Arrows in FIG. 1 (shown by reference symbol W2) show a path via which cooling water is supplied and a path via which the cooling water is sent out. To be specific, the cooling water is introduced from the lower path, circulated the inside of the dual structure (between the inner wall a and the outer wall b) and discharged from the upper path. The first cooling means may adopt, besides cooling water, cooled water, brine (calcium chloride, antifreeze solution of propylene glycol, ethylene glycol), cooled gas, Freon gas. The first cooling means R1 is preferably disposed at a position (T2) above a position (T3) at which liquid (foamless liquid) is stored in the defoaming unit F (FIG. 6). This is because the liquid can travel down along the wall surface a of the defoaming unit F. When heating by the heating step V2 is performed by disposing the heating step V2 above the defoaming unit F, the transfer means (transfer pump) can be omitted.

The defoaming unit F is provided below its small-diameter portion Fb with a vent Fj to which the pipe line u6 is connected to discharge the liquid via the transfer pump P2 and simultaneously supply it to a primary extracting unit B1 of the extracting unit V4. The position of the vent Fj may be at the position at which the liquid (soybean soup) is stored, and the liquid may be discharged via the drainage pump P2 from the lateral direction of the can-shaped large-diameter portion Fa of the defoaming unit F.

An extracting unit B is disposed at the extracting step V4 and comprises the primary extracting unit B1 and a secondary extracting unit B2. The primary extracting unit B1 is for extracting soymilk Tn1 through spontaneous filtering not forcibly applying pressure to a defoamed soybean soup go3, comprises a helix of homogeneous pitches rotated by the motor M1 and a cylindrical SUS net N1 formed on the outer periphery of the helix S1, separates the soybean soup into the soymilk Tn1 and a soybean soup (gruel-like soybean soup), extracts the soymilk. Tn1 and feeds it to a soymilk tank T1. On the other hand, the secondary extracting unit B2 takes out bean curd refuse Tn2 while compressing the soybean soup (gruel-like soybean soup) go4 having the soymilk Tn1 extracted with the primary extracting unit B1 and, at the same time, separates a liquid residue Tn3 from the gruel-like soybean soup. The secondary extracting unit B2 is rotated by means of a motor M2, equipped with a helix S2 of pitches narrower gradually toward the advancing direction of the soybean soup and a cylindrical SUS net N2 formed on the outer periphery of the helix S2, and has an exit B3$j$ formed into a funnel shape directed downward so as to return the liquid residue to the liquid residue-returning step V5 and a lower exit end to which a pipe line u11 is connected. A transfer pump P4 is connected to a position in the vicinity of the pipe line u11 and has an exit connected to the pipe line u12 that is connected to the pipe line u4 (or pipe line u5) for the exit of the second heating unit 112. The pipe line u11 is connected to the pipe line u4 (or pipe line u5) by means of a pipe line connector CN11. Therefore, the liquid residue (speck liquid) Tn3 separated at the extracting step V4 can be sent again to the defoaming step V3 by means of the transfer pump P4. Incidentally, the pipe line u12 has an opposite end provided with a check valve for preventing the back-flow of a soybean soup go2 to the solution-sending pump P4. The pipe line u5 has a static mixer K1 connected thereto and to the defoaming unit F via a pressure keeping valve. The static mixer K1 is a mixer having no power source therein and a unit for uniformly mixing the heated soybean soup go2 and liquid residue Tn3 which repeat dispersion, collision, twist, etc. when passing through the inside of the static mixer. The soybean soup go2 (and further the liquid residue Tn3) sent from the static mixer K1 is fed into the defoaming unit F while having its pressure kept constant by means of the pressure keeping valve.

A process for producing soymilk will next be described. Preparatory to the production of soymilk; the atmospheric pressure in the can-shaped defoaming unit F is reduced by means of the vacuum pump P3. Air bubbles are generated at the separating step in the extracting step V4, at the transferring step using the pipe lines u3, u5, u7 and u12 or by means of cooking (heating) and when the liquid residue returned at the liquid residue-returning step is mixed with the heated soybean soup. In addition, when the soybeans are ground down by friction in an open state, with water added thereto, the soybean soup already contains plenty of bubbles even in a state before being heated.

At the soybean soup-producing step V1, soybeans that are materials for tofu or fried bean-curd are introduced from the soaked soybean hopper into the friction-grinding unit M by a constant amount every time and ground down with the friction-grinding unit M into a raw soybean soup. The soybean soup supplied to the heating step V2 is next heated with direct heating means Y1 and Y2 blowing steam into the pipe lines u3 and u4. The heated soybean soup go2 is supplied into the defoaming unit F via the pipe lines u4 and u5. In addition, since the pipe lines u4 and u5 are connected to each other with the pipe connector CN11, the soybean soup and the liquid residue Tn3 flow into each other and are supplied into the defoaming unit F. Here, when the position of the two substances flowing into each other is "behind the heating unit" on the side closer to the heating unit H2 (H1) than to the defoaming unit F, the two substances are thermally influenced greatly, whereas when the position is "before the defoaming step" on the side closer to the defoaming unit F than to the heating unit H2 (H1), the two substances are thermally influenced not so much.

The liquid residue Tn3 and the heated soybean soup go2 flowing into each other at the connector CN11 are uniformly stirred and mixed by the static mixer K1 and, at this time, since the temperature of the liquid residue Tn3 is elevated by the heat the soybean soup go2 has, it is possible to rapidly elevate the temperature evenly while uniformizing the temperatures of the soybean soup go2 and the liquid residue Tn3.

The soybean soup sent to the defoaming unit F is dispersed in the can by the dispersing means fd and, at the same time, boiled under reduced pressure and, when the soybean soup boiled and simultaneously foamed travels down along the inner wall surface of the defoaming unit F, condensed. The inside of the can body of the defoaming unit F is reduced in pressure by the external vacuum pump P3 and, the degree of vacuum is adjusted to an extent to which the soybean soup supplied to the defoaming unit F assumes a boiled state. When the soybean soup is being boiled, the air entrained in the soybean soup is evaporated without being unable to continue existing in solution and, when changing from liquid to vapor, the water has its volume expanded rapidly. Therefore, the bubbles minutely entrained in the soybean soup are expanded and burst. Though the soybean soup is once deprived of air, it foams again when colliding against the can wall. Particularly, in the absence of a defoamer, the soybean soup is apt to foam and, since foams of the soybean soup having not only soymilk but also bean curd refuse or speck liquid contained therein are very hard and difficult to burst and, therefore, become accumulated increasingly within the can body. The gas forming foams produced within the can body of the unit F is not air, but water vapor. Since the defoaming unit F used in the present invention is provided, on the can wall portion midway the path from passing of the soybean soup dispersed from the flush disc fd along the inner wall of the can body and traveling down up to being stored, with the cooling means R1 having been cooled with the cooling water, the vapor in the foams are condensed and faded when passing through the cooling means to entirely liquefy the foamed soybean soup. Thus, the defoaming unit F preferably is equipped with the cooling means R1 and defoams the heated soybean soup while cooling the same. In the case where the defoaming unit F is not provided with the cooling means R1, since the foams produced within the can contain bean curd refuse and specks, it takes much time to allow the foams to spontaneously disappear and, since the soybean soup is successively supplied from the preceding step during such time, the can is filled with the foams that flow out all for nothing toward the side of the vacuum pump P3. In addition, since the soybean soup is discharged without being sufficiently liquefied, when it is sent to the discharge side of the transfer pump P2, impact of the foams immediately fading causes the connecting pipe line u7 (u6) to vibrate, thereby loosening a joint to possibly allow the equipment to malfunction. In addition, since the soybean soup within the can is not completely liquefied, it becomes impossible to detect the liquid level and control the liquid level. Furthermore, the can body is needed to have a volume large enough to spontaneously cool the foams by outgoing radiation of the can wall and secure sufficient time to condense the soybean soup. Thus, by configuring the defoaming unit F such that the heated soybean soup is boiled under reduced pressure and then cooled, the soybean soup having the soybean soup go2 and the liquid residue Tn3 mixed therein and containing hard foams can be condensed and liquefied. Therefore, even when the equipment is small-sized, all the foams in the soybean soup in consequence of having passed through the defoaming unit F disappear and the soybean soup completely liquefied is sent to the extracting step V4 (extracting unit B).

Since almost all the foams in the defoaming unit F are composed of vapor, the foams fade quickly (fade at once) when being cooled by the cooling means R1, and liquefied. The liquid containing foams (mixture of the soybean soup got and the liquid residue Tn3) allows the moisture content of the soybean soup to be evaporated until water reaches its boiling point varying depending on the degree of vacuum in the defoaming unit F at that time. The bubbles regenerated at that time are cooled by the first cooling means R1 and immediately fade and liquefied. In other words, since the soybean soup is boiled at the moment it is introduced into the defoaming unit F having been reduced in pressure to saturated vapor pressure or below and since it evaporates the moisture content at that time (is deprived of its heat of evaporation at that time) to lower its temperature to its boiling point varying depending on the degree of vacuum, all the amount of the soybean soup foamed in that state is condensed to fade the foams. For this reason, it becomes possible to detect the liquid level with the liquid level detector 15. To be specific, according to the liquid level detection by the differential pressure sensor of the liquid level detector 15, the lower detection portion detects the pressure having the pressure in the defoaming unit F (that may be positive pressure, negative pressure or atmospheric pressure) added by the depth of the liquid and the upper detection portion only detects the pressure in the defoaming unit F and, therefore, it is possible to continuously detect only a variation in liquid depth through reading the difference between the pressures detected by the upper and lower detection portions even when the pressure in the defoaming unit F (degree of vacuum, for example) varies. By controlling the discharge amount of the drainage pump (drainage means) P2 to be a constant level, therefore, the liquid level can be kept constant. In addition, it is possible to not only control the discharge amount (drainage amount) by the drainage pump (drainage means), but also control the supply amount using the disposed supply pump, with the discharge amount kept constant, to enable the liquid level to be kept constant. By setting the liquid level at a determined position, the section at which the soybean soup travels down is guaranteed. In this way, since the height of the liquid staying (liquid level) can be controlled to a desired level, the section at which the soybean soup travels down can completely be guaranteed (determined). The section can be set (designed) as a thin soybean soup film stable section (reference symbol T1 in FIG. 6) or a cooling section (reference symbol T2 in FIG. 6).

The soybean soup go3 liquefied at the defoaming step V3 is taken out from the vent u6 by means of the transfer pump P2. Though the transfer pump P2 is preferred, as the drainage pump P2, to discharge the liquid having an even lower temperature than the boiling point because cavitation is difficult to occur, the fact that the soybean soup is cooled is desirable for the transfer pump P2. In addition, since the soybean soup is not foamed, the compressing pressure (liquid pressure) is sufficiently applied to the transfer pump P2 and, since the NPSHav (Net Positive Suction Head available) effective for the transfer pump P2 becomes large, the height of a liquid level 11c to be maintained and the height of the apparatus can be made low to attain cost reduction. Though the soybean soup is then sent to the subsequent extracting step V4, since the amount thereof to be sent is constant even when the post-step V4 adopts the extracting unit B, no load change is exerted onto the extracting unit B. Furthermore, since it is unnecessary for the apparatus to be selected in compliance with the maximum load at the time of a load change, this is also effective for cost reduction.

At the extracting step V4, the soymilk Tn1 is first extracted without applying any forcible pressure to the soybean soup go3 having been defoamed by a spontaneous filter that is the primary extracting unit B1. The spontaneous filter B1 has a shape having the net N1 of small meshes wound cylindrically and the helix disposed therein and, when the soybean soup go3 is supplied from the end of the rotating cylindrical net N1, the soymilk Tn1 passes the net N1 and falls on a tray by gravity, is discharged from a soymilk exit B1j and supplied to the soymilk tank T1. On the other hand, the gruel-like soybean soup go4 not having passed the net N1 is sent to the end opposite the end on the supply side by means of the rotation of the cylindrical net N1 and the helical structure and to the secondary extracting unit B2 via its passing path.

When all the amount of the defoamed soybean soup go3 has been supplied to the spontaneous filter B1, the bean curd refuse of coarse particle size is placed on the net N1 to serve as a filtering material, thereby exhibiting an effect of filtering even specks of fine particle size. Furthermore, since the number of cases where the specks come into direct contact with the filtering net N1 is reduced, the net is difficult to clog. In addition, almost all part of soymilk Tn1 sent to the post-step is obtained through spontaneous filtration by gravity and, since no strong force is exerted onto the soybean soup, damages, such as protein denaturation, are not suffered. The soymilk Tn1 thus obtained is suitable for producing tofu having high elasticity and, since the color of fried tofu (fried bean-curd), deep-fried tofu or deep-fried soft tofu is not deteriorated, soymilk optimum for fried foods can be obtained.

The gruel-like soybean soup go4 after almost all part of soymilk Tn1 is separated is sent to the secondary extracting unit B2 and separated there into dewatered bean curd refuse Tn2 and liquid residue (speck liquid) Tn3. The liquid residue Tn3 is collected from the exit B3j onto the pipe line u11 and sent to the liquid residue-returning step V5 by means of the transfer pump P4. Here, though the soybean soup go3 collides against the rotating helix in the primary extracting unit B1 to generate foams, the foams generated in the primary extracting unit B1 is sent to the secondary extracting unit B2 together with the gruel-like soybean soup go4 and, since pressure application filtration is performed at the secondary extracting unit B2, even when the foams have passed through the filtering screen N2 without modification together with the speck liquid Tn3, they are collected at the liquid residue exit B3j and forcibly returned via the pipe line u12 by means of the transfer pump P4. To be specific, the foams are discharged as being suctioned from the liquid residue exit B3j and returned. For this reason, situations that have heretofore been experienced, in which speck liquid is mixed in a soymilk path together with bubbles and in which: foams of filtered residue separated overflow in a lower tank, are prevented. The transfer pump P4 is preferred to be a positive-displacement pump having a self-suction ability, such as a rotary pump, vane pump, gear pump, NEMO pump, tubing pump, plunger pump or diaphragm pump.

In addition, in a conventional producing process, the liquid residue (speck liquid) Tn3 is disposed of or returned to the entrance of an extracting unit and circulated, thereby leaving foams overflowed and accumulated. In the producing process of the present invention, however, the foam-containing speck liquid Tn3 recovered from the secondary extracting unit B2 is all returned to the position before the soybean soup defoaming step V3 or behind the heating step V2. Since the soybean soup go2 of high temperature immediately after being heated at the heating step V2 is sent to the defoaming step V3, even when the speck liquid Tn3 lowered in temperature through the first and second filtering steps (extracting step) V4 is supplied to the defoaming step, it is mixed with the soybean soup go2 of high temperature, thereby making it possible to sufficiently secure the temperature at which the defoaming effect can be obtained. Here, in order to attain uniform mixing, a static mixing portion or dynamic stirring means may be provided on the pipe line u5 reaching the defoaming unit F. In addition, when the final cooking temperature of the soybean soup go2 exceeds 100° C., in order to improve the efficiency at the extracting step V4, the exit of the heating step V2 may be provided with a cooling pipe to cool the soybean soup go2 to have a temperature of 100° C. or less. In this case, returning the speck liquid Tn3 induces the effect of lowering the temperature of the soybean soup go2 to a suitable temperature, resulting in reducing the amount of cooling water to be used for the cooling pipe.

Thus, by forming a path going through the extracting step V4 having the spontaneous filter B1 that makes the cause of generating foams and forming circulation and by adding the foam-extinguishing element that is the defoaming unit F to the inside of the path, it is possible to stably produce high-quality soymilk having a good flavor soymilk has per se even in the absence of a defoamer.

Figure 4:
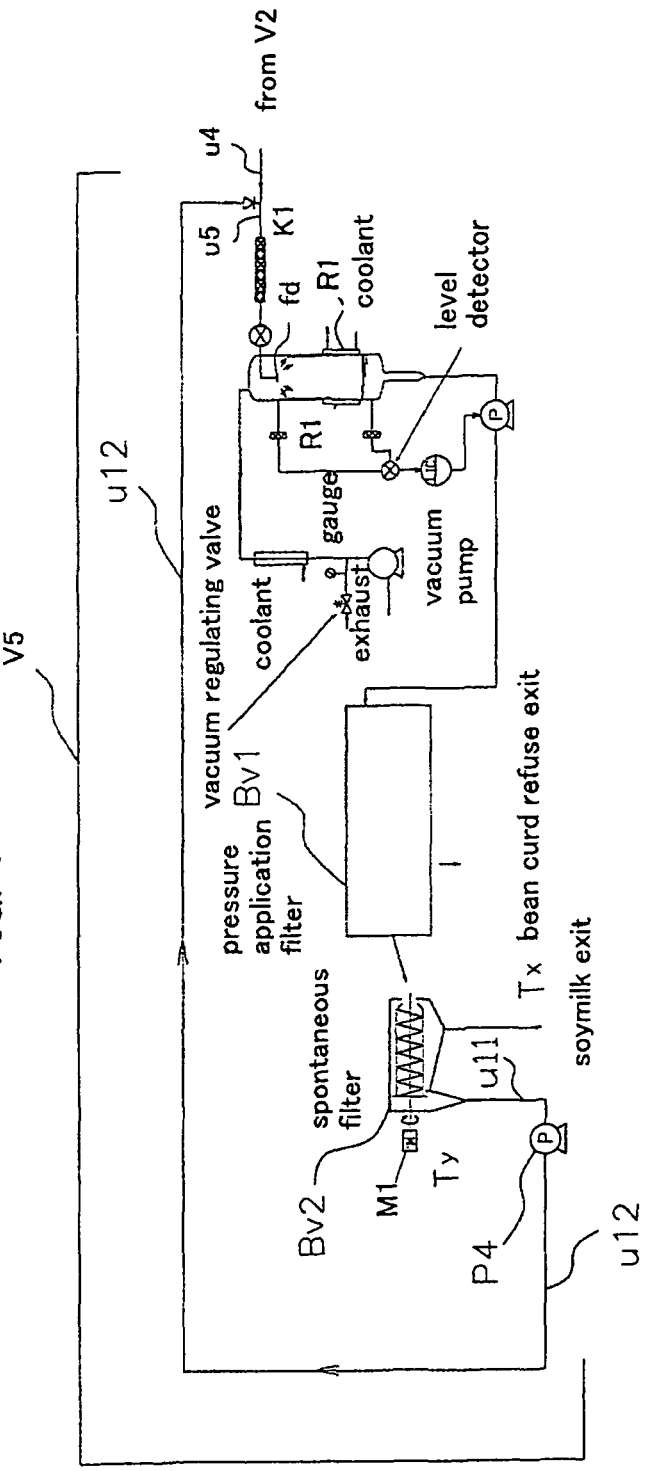
FIG. 4 is a schematic view illustrating the soymilk producing apparatus according to yet another embodiment of the present invention.

In addition, in the above embodiment, though the work by the primary extracting unit B1 of the extracting unit B uses the spontaneous filter B1 utilizing the gravity and the work by the secondary extracting unit B2 uses the pressure application filter B2, other combinations than these may suitably be used. As shown in FIG. 4, for example, the work by the primary extracting unit B1 may use a pressure application filter Bv1 to perform filtering by pressure application, thereby separating a soybean soup into bean curd refuse and soymilk containing a plenty of specks, and the work for removing the specks from the soymilk by the secondary extracting unit B2 may utilize a spontaneous filter Bv2. At the spontaneous filter Bv2, the soymilk is taken out from an exit Tx and the specks are sent to the liquid residue-returning step V5 using the pipe lines u11 and u12 connected to an exit Ty and the transfer pump P4. Though this system is inconvenient for tofu or fried tofu because a physically strong force exerted onto the soymilk denatures the soybean protein in the soymilk, it has advantages including the reduction of the amount of the soymilk remaining in the bean curd refuse, and the high-speed separation in spite of the high-concentration soymilk.

To the contrary, when the soymilk containing the specks is supplied to the spontaneous filter portion B1 in the above embodiment, the screen is likely to be clogged with the specks sticking to the small meshes thereof. However, supplying all the amount of soybean soup initially to the spontaneous filter portion B1 allows bean curd refuse having a coarse particle size to be placed on the net and function as a filtering material, thereby exhibiting an effect of filtering even specks having a fine particle size. Furthermore, since the possibility of bringing the specks into direct contact with the filtering net, clogging is hard to occur. Moreover, almost all part of soymilk sent to the post-step is obtained through spontaneous filtration by gravity and, since no strong force is exerted onto the soybean soup, damages, such as protein denaturation, are not suffered. The soymilk thus obtained is suitable for producing tofu having high elasticity and, since the color of fried tofu, deep-fried tofu or deep-fried soft tofu is not deteriorated, soymilk optimum for fried foods can be obtained.

In place of the spontaneous filter used in the embodiment of FIG. 4, a clarifier that is a centrifugal separator using a separating disk (plate) may be used. The clarifier allows soymilk to be supplied into a bowl that is rotating at high speed, utilizes a centrifugal force to precipitate the specks in the soymilk and opens and closes the bowl at regular intervals to discharge the specks accumulating on the outer periphery of the bowl out of the bowl. Generally, however, since low flowable specks having a small amount of water content are discharged out and washed away with cleaning water or specks exhibiting flowability are discharged out and disposed of without giving any modification thereto, an effluent load in drainage treatment and reduction in yield have been induced. In addition, since soymilk produced without addition of a defoamer is foamable, a waste solution containing specks contains a plenty of foams, a problem of inducing the contamination of a drainage path with foams and like problems have been posed.

Figure 5:
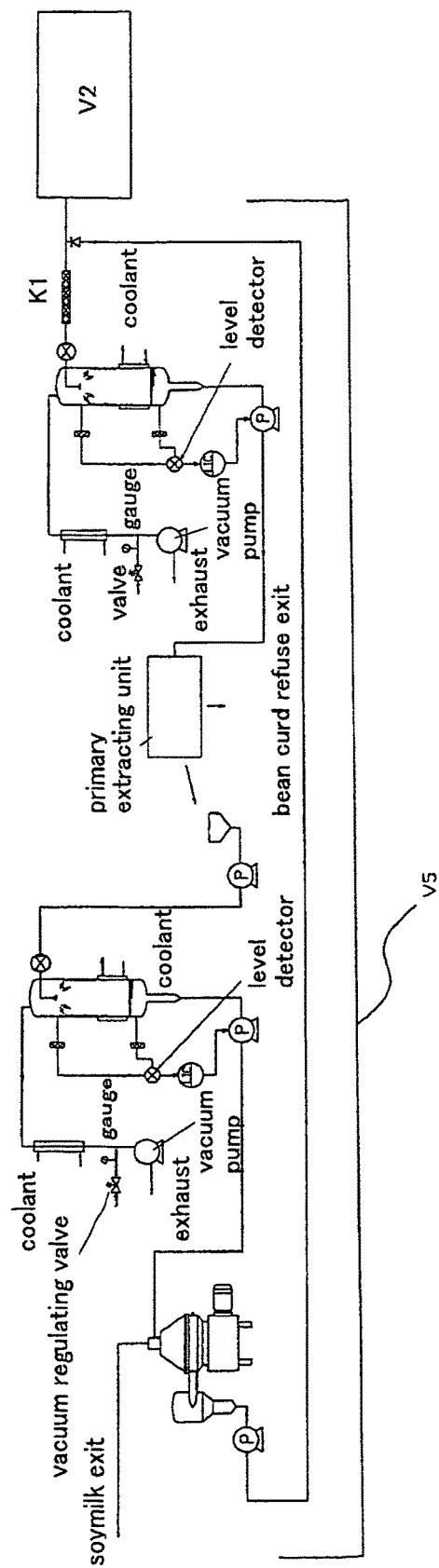
FIG. 5 is a schematic view illustrating the soymilk producing apparatus according to a further embodiment of the present invention.

However, by returning to a position before the defoaming step V3 the speck liquid discharged out of the clarifier in a still flowable state and foamed by an impact at the discharging time using the positive-displacement pump P4 and discharging the same together with coarse bean curd refuse at the work using the primary extracting unit B1 after the deaeration treatment, it is possible to prevent reduction in yield without inducing any effluent load in drainage treatment and contaminating the drainage path. Since the content of foams becomes a hindrance to centrifugal precipitation, when there is a possibility of soymilk being foamed at the work using the primary extracting unit B1, it is desirable to dispose a defoaming unit for soymilk, as shown in FIG. 5, at a position behind the work using the primary extracting unit B1 and make a treatment using the clarifier.

Example 1

Soybeans were soaked in water for around 12 hours and allowed to absorb water until the weight thereof became 2.2 to 2.3 times the original weight, and supplied to a continuous friction-grinding cooking unit (MIRACLE THUNDER) manufactured by Takai Tofu & Soymilk Equipment Co. In the Miracle Thunder, 8.8 kg per min of the soaked soybeans were ground down by friction, with 14 l per min of water added thereto, using a friction-grinding unit M to obtain raw soybean soups go1 that was then sent to heating units H1, H2, . . . , using a rotary pump P1. No defoamer was added to the raw soybean soups at that time. Six heating units (H1, H2, . . . and H6) disposed continuously and steam blowing means Y1, Y2, . . . and Y6 disposed midway at six places were used to heat the soybean soups to 55° C., 75° C., 95° C., 100° C., 102° C. and 105° C., respectively, and the period of time of the heated soybean soups reaching an exit was set to be about six minutes. The heated soybean soups go2 were introduced into a defoaming unit F. In the defoaming unit F, the soybean soups go2 were sprayed into a can body reduced in pressure to −0.0168 MPa, and the soybean soups go2 introduced into the can body were boiled, evaporated their water contents and were deprived of their latent heat, thereby reaching a can wall while lowering their temperatures and traveling down along the can wall. It was noted here that since the −0.0168 MPa was the degree of vacuum under which water was boiled at 95° C., the soybean soups lowered their temperatures to about 95° C. Though the soybean soups go2 had small foams entrained therein when reaching the can wall a, since they contained bean curd refuse (a mixture of the soybean soup go2 and liquid residue Tn3), they failed to readily defoam unlike soymilk. However, since the gas contained in the foams was not air, but water vapor, the foam-like soybean soups traveling down along the can wall were cooled when passing through cooling means R1 disposed on a barrel portion of the can body and cooled with cooling water W2, to thereby condense the water vapor constituting the foams and liquefy all the soybean soups. In addition, since the soybean soups were cooled by the cooling means R1, soybean soups go3 sent out from the defoaming unit F were all liquefied at a temperature of 85° C. to 90° C., and the soybean soups go3 containing no foam were directly supplied to a spontaneous filter B1 of an extracting unit (SILIUS) B manufactured by Takai Tofu & Soymilk Equipment Co. The soybean soups were separated at the spontaneous filter B1 into soymilk Tn1 and a gruel-like soybean soup go4. The soybean soup go4 was fed to a lower dehydrator B2 and dehydrated under pressure by means of a screw S2 and a cylindrical filtering screen N2, and bean curd refuse Tn2 was discharged out from a front vent B2j. The soymilk containing specks that were the liquid residue was received in a lower tank and returned to the defoaming unit F via a pipe line u12 by means of a positive-displacement pump P4.

The soymilk Tn3 returned as containing the pecks and the soybean soup go2 heated with a heating unit H flowed into each other and stirred and mixed with a static mixer K1. Incidentally, the amount of the liquid residue Tn3 was around 10% to 20% of the amount of the heated soybean soup go2. Though the speck-containing soymilk Tn3 passed through an extracting step V4 had its temperature lowered to 65 to 75° C., since the amount of the high-temperature soybean soup go2 sent from the heating unit H was larger than that of the speck-containing soymilk Tn3, the temperature of the stirred and mixed soybean soup was around 100° C., though varying depending on the timing the liquid was returned, which was the temperature high enough to boil the liquid at the defoaming unit F. The high-temperature soybean soup having the speck-containing soymilk Tn3 stirred and mixed therewith was passed through the defoaming unit F and sent to the extracting unit B, and the specks were discharged out together with bean curd refuse contained in a soybean soup supplied anew, and this sequence was repeated. Thus, even when continuing the production without addition of any defoamer, no hindrance to the extracting step V4 resulting from foams or accumulation of foams was induced to continue the stable production for a prolonged time.

Comparative Example 1

The case where the speck liquid Tn3 discharged out from the exit B3j of the secondary extracting unit B2 was returned to the primary extracting unit B1 will be described as Comparative Example 1. The procedure taken up to obtaining the heated and defoamed soybean soup go3 passing through the continuous heating units and defoaming unit F was the same as in Example 1. The soybean soup go3 taken out from the defoaming unit F was fed to the spontaneous filter B1 disposed on the upper portion of the extracting unit (SILIUS) B manufactured by Takai Tofu & Soymilk Equipment Co. The soybean soup go4 after being separated by the spontaneous filter B1 into the soymilk Tn1 and the gruel-like soybean soup go4 was fed to the lower dehydrator B2 and dewatered under pressure by means of the screw S2 and filtering screw N2, the bean curd refuse Tn2 was discharged out from the vent B2j, and the speck liquid Tn3 was stored in the lower tank and then discharged out from a vent B3j. The discharged speck liquid Tn3 was fed to the spontaneous filter B1 with the pump P4. However, foams began to accumulate within the lower tank gradually from the beginning of the separation and, in 15 minutes from the separation, the lower tank was fully filled with foams. Furthermore, the filtration efficiency of the upper spontaneous filter B1 was lowered, the amount of the separated soymilk Tn1 discharged was reduced, and the soybean soup overflowed the lower tank without waiting for a lapse of 30 minutes from the separation, thereby disabling operation continuation.

Example 2

The high-temperature defoamed soybean soup go3 was obtained through the continuous heating units and defoaming unit F by following the procedure of Example 1. The soybean soup go3 taken out of the defoaming unit F was directly supplied to an extracting portion of an extracting unit (TWIN MEISTER) manufactured by Yanagiya Co., Ltd. The soybean soup was separated by two screen rolls into bean curd refuse and soymilk, and the soymilk was taken out of a soymilk exit. However, since the soymilk contained many specks, it was led to a rotating cylindrical net of a speck remover (of a spontaneous filtering system) manufactured by Takai Tofu & Soymilk Equipment Co. to isolate the specks in the soymilk. The speck liquid thus isolated was sent in the direction opposite the soymilk entrance by means of a helix disposed in a cylinder and discharged from the end of the cylinder to a vent Ty. The vent Ty had a lower portion connected to a suction opening of a positive-displacement pump P4, and the discharged speck liquid was returned by means of the positive-displacement pump P4 to the exit of the heating unit, i.e. the entrance of the defoaming unit F. Incidentally, the amount of the liquid residue Tn3 (the speck liquid in Example 2) was 10% to 20% of the amount of the heated soybean soup go2. Though this system was operated without use of any defoamer, the production could be continued for 10 hours or more without any obstacle (FIG. 4).

Comparative Example 2

The speck liquid (liquid residue) separated in Example 2 was returned to a soybean soup tank (not shown) of the extracting unit (TWIN MEISTER) manufactured by Yanagiya Co., Ltd. by means of the positive-displacement pump P4 disposed on the lower portion of the vent. The soybean soup sent by the pump from the soybean soup tank was supplied to an upper extracting portion and separated by the two screen rolls into bean curd refuse and soymilk. Though the soymilk was taken out of the soymilk exit, since it contains many specks, it was led to the rotating cylindrical net of the speck remover (of the spontaneous filtering system) manufactured by Takai Tofu & Soymilk Equipment Co. to isolate the specks in the soymilk. The isolated speck liquid was sent in the direction opposite the soymilk entrance by means of the helix disposed in the cylinder and returned by the positive-displacement pump P4 disposed on the lower portion of the vent to the soybean soup tank of the TWIN MEISTER. Foams began to accumulate within the soybean soup tank from the start of production and, in about 15 minutes, overflowed the soybean soup tank. In about 20 minutes from the start of production, the speck exit of the speck remover was clogged with foams, and overflowing speck liquid flows to the side of the soymilk path, thereby disabling the production.

Comparative Example 3

The same procedure as in Example 1 using the defoaming unit equipped with the cooling mechanism was performed under the same conditions as in Example 1 except for use of a defoaming unit (decompression device) equipped with no cooling mechanism. In this case, since the foams in a can of the decompression device contained bean curd refuse, it took much time to allow the foams to spontaneously disappear and, during the time, since the soybean soup was successively supplied from the pre-step, the foams was filled in the can and flowed out toward the side of a vacuum generator (the side of the vacuum pump P3) to constitute a loss. In addition, since the soybean soup was discharged out without being sufficiently liquefied, when it had been sent to the discharge side of the pump, an impact produced immediately after the foams were crush vibrated the connection pipe lines to induce obstacles including loosening of joints, malfunction of equipment, etc. In addition, since the soybean soup in the can was not completely liquefied, it was unable to detect and control the liquid level.

The present invention is not limited to the embodiments described above. Though the subject matter of the present invention is an ordinary high-temperature soybean soup heated, any modification can be adopted if attention is paid to the degree of vacuum under which boiling is attained at normal room temperature with respect to a unheated raw soybean soup extracting step, the corresponding vacuum generating mechanism, and the kind and temperature of a coolant used for cooling. That is to say, in the case of a system for obtaining soymilk through room-temperature friction grinding and separation immediately thereafter, equipment capable of obtaining high vacuum provided at a vacuum generation part, such as a root type-vacuum pump or mechanical booster pump, etc. and, as the case may be, a cold trap can be used in place of the aforementioned condenser (second cooling means) to make it possible to effect cooling by means of the first cooling means using a coolant, such as brine. Incidentally, the normal room temperature used herein means a range of temperatures obtained without use of any intentional heating means and does not particularly limit the temperature range. However, it generally indicates an optional temperature of 0° C. or more and 40° C. or less. Thus, it goes without saying that the present invention may suitably be modified without departing from its gist.

The invention claimed is:

1. A method for producing soymilk, comprising:
   a heating step of heating a soybean soup in a heating unit thereby obtaining a heated soybean soup;
   a defoaming step of defoaming the heated soybean soup in a defoaming unit thereby obtaining a defoamed soybean soup;
   a primary extracting step of separating the defoamed soybean soup into soymilk containing specks and bean curd refuse thereby removing the soymilk containing the specks;
   a secondary extracting step of further separating the soymilk containing the specks into a liquid residue containing minute bean curd refuse and soymilk thereby obtaining the liquid residue containing the minute bean curd refuse; and
   a liquid residue-returning step of returning the liquid residue to a portion between the heating step and the defoaming step at a position closer to the heating unit than the defoaming unit in an amount of 10% or more and 20% less of the heated soybean soup, mixing the liquid residue and the heated soybean soup to raise a temperature of the liquid residue to a temperature high enough to boil the liquid residue in the defoaming unit, and refeeding the liquid residue to the defoaming step;
   wherein the heating step, the defoaming step, the extracting step, and the liquid residue-returning step are processed in this order, and
   wherein the liquid residue-returning step further comprises a stirring and mixing step for stirring and mixing the liquid residue and the heated soybean soup thereby obtaining a stirred and mixed liquid residue, which is fed to the defoaming step.

2. A method for producing soymilk according to claim 1, wherein the defoaming step further comprises boiling the stirred and mixed liquid residue and the heated soybean soup under a reduced pressure thereby obtaining a boiled liquid, and
cooling the boiled liquid with a cooling unit to defoam the boiled liquid.

3. An apparatus for producing soymilk, comprising:
   a heating unit for heating a soybean soup to form a heated soybean soup;
   a defoaming unit for defoaming the heated soybean soup to form a defoamed soybean soup;
   a preliminary extracting unit for separating the defoamed soybean soup into soymilk containing specks and bean curd refuse and removing the soymilk containing the specks;
   a secondary extracting unit for further separating the soymilk containing the specks into a liquid residue containing minute bean curd refuse and soymilk to form the liquid residue containing the minute bean curd refuse;
   a first pipe line for feeding the heated soybean soup to the defoaming unit, comprising a pressure keeping valve for keeping the heated soybean soup at a predetermined pressure when the heated soybean soup is fed to the defoaming unit; and
   a second pipe line for returning the liquid residue to the first pipe line, comprising
      a transfer pump for returning the liquid residue to the first pipe line, an entrance of the transfer pump connected at a side of an exit of the secondary extracting unit,
      an exit connected at a side of the pressure keeping valve, and
      an entrance connected to an exit of the transfer pump,
   wherein the heating unit, the defoaming unit, and the extracting unit are connected in this order.

4. An apparatus for producing soymilk according to claim 3, further comprising a static mixer for stirring and mixing the liquid residue returned with the transfer pump and the heated soybean soup to form a stirred and mixed liquid residue,
   wherein the mixer is present on the first pipe line.

5. An apparatus for producing soymilk according to claim 3, wherein the defoaming unit boils the liquid residue and the heated soybean soup under a reduced pressure to obtain a boiled liquid, the defoaming unit has a cooling unit that cools the boiled liquid, and the cooling unit has a liquid level indicator controller.

6. An apparatus for producing soymilk according to claim 3, wherein the transfer pump is one self-suction positive-displacement transfer pump selected from the group consisting of a rotary pump, a gear pump, a tubing pump, a Moineau pump, a plunger pump, a vane pump, and a diaphragm pump.

7. A method for producing soymilk according to claim 1, wherein in the liquid residue-returning step, the liquid residue at 65° C. or more and 75° C. or less is returned to the portion between the heating step and the defoaming step, and the temperature high enough to boil the liquid residue in the defoaming unit is around 100° C.

8. An apparatus for producing soymilk according to claim 3, wherein the exit of the second pipe line is disposed closer to the heating unit than the defoaming unit between the heating unit and the defoaming unit, the heated soybean soup is mixed with the liquid residue in an amount of 10% or more and 20% less of the heated soybean soup, and the liquid residue is heated to a temperature high enough to boil the liquid residue in the defoaming unit.

9. An apparatus for producing soymilk according to claim 3, wherein the second pipe line further comprises a check valve preventing the heated soybean soup back-flowing towards the transfer pump.

10. A method for producing soymilk according to claim 1, wherein the secondary extracting step further comprises removing the specks by a spontaneous filtering system.

* * * * *